Patented Sept. 5, 1944

2,357,395

UNITED STATES PATENT OFFICE 2,357,395

PHOTOGRAPHIC EMULSION

Alfred Fröhlich and Wilhelm Schneider, Dessau, Germany, assignors to General Aniline & Film Corporation, New York, N. Y., a corporation of Delaware No Drawing. Application November 18, 1941, Serial No. 419,568. In Germany July 17, 1940

11 Claims. (Cl. 95—6)

Our present invention relates to the production of photographic emulsions, and particularly to emulsions for color photography.

It is known in the production of photographic color images by means of color forming development to incorporate such aromatic hydroxy compounds as the dyestuff formers for producing blue tints into the emulsion layers as exhibit an unsubstituted p-position relative to the hydroxy group, such as phenols, naphthols or similar ring systems or contain a readily replaceable substituent in the p-position and are fast to diffusion with respect to the layer-forming colloid owing to the substitution of suitable groups or radicals. For the production of multi-color images by means of multi-layer materials especially for the negative-positive process it is desirable to use dyestuff formers for blue which exhibit a transmission as high as possible of the rays in the green range of the spectrum and likewise show no or only a light absorption in the blue. Dyestuff formers having certain substituents as, for instance, halogen-substituted naphthols have already been proposed to give such tints. In order to obtain a color photographic material of highest quality, it is, however, necessary to make this constitution producing the green tints agree with other desired properties of the dyestuff former, namely that the color image possesses a gradation as brilliant as possible particularly for the positive process and that the sensitiveness which the emulsion per se shows in a process of development in black and white is reached or, if possible, surpassed in a color developing process which is important for the negative process. Just the latter property is substantially dependent on the constitution of the dyestuff former. When a graduated wedge, for instance, is copied onto a silver halide emulsion layer containing α-hydroxy-naphthoyl-dodecylaminosulfonic acid as the dyestuff former, a blue wedge having a good brilliancy and a high threshold value is obtained by the color development. The color value of the blue wedge, however, is not satisfactory for the negative process since the absorption maximum thereof is at about 650 mμ and the absorption range extends still far into the green region of the spectrum. When a silver halide emulsion, however, containing as the dyestuff former the condensation product from α-hydroxynaphthoic acid and aminooctadecylaminotoluenesulfonic acid is used on exposure through a graduated wedge and color development a dyestuff image satisfactory since it exhibits a high transmission of green rays and an absorption maximum of beyond 700 mμ but the color wedge of which shows a lower brilliancy and a lower threshold value than that in the example afore-mentioned.

It is an object of our present invention to provide dyestuff components which are capable of forming dyestuffs having a relatively high transmission of green rays and make the preparation of highly sensitive emulsions yielding high brilliancy possible.

Further objects will be apparent from the description following hereinafter.

These objects are accomplished by using as dyestuff formers condensation products from aromatic hydroxy acids capable of coupling with aromatic amines the ring of which does not carry acid substituents and which contain at least one aliphatic carbon chain. This chain may be simple, branched, saturated or unsaturated. Aromatic hydroxy acids capable of coupling include α-hydroxynaphthoic acid, 1-hydroxynaphthalene - 2 - sulfonic acid, 1.2.3.4-xylenolcarboxylic acid, 1-hydroxy-2-carbazolecarboxylic acid, 2.6-hydroxybenzenedicarboxylic acid, 1-hydroxy-6-methoxynaphthalene - 2 - carboxylic acid, and 5-hydroxyquinoline-7-carboxylic acid. These hydroxy acids are reacted with aromatic o- or p-diamines one amino group of which carries one or two aliphatic hydrocarbon or fatty acid radicles at least one radicle of which possesses more than five carbon atoms and which contain in their aromatic ring no acid substituents. Such diamines include, for instance, p-methyloctadecylaminoaniline, p - stearylamino-aniline, o-methyl-dodecylaminoaniline, p-dodecylaminotoluidine, 4-methyloctadecylamino-1-naphthylamine, 4 - methyl - octadecylamino - 1 - aminocarbazole, 4 - methyl - octadecylamino-1-amino-2-ethoxybenzene, and p-stearylamino-o-methoxyaniline. These diamines may, for instance, be prepared by reacting the corresponding nitrochlorobenzenes with aliphatic amines.

Instead of these diamines there may be employed aromatic amino amines the nucleus of which has directly attached thereto by means of a —C—C— or —C—O—C— linkage at least one carbon chain having more than five carbon atoms in the form of hydrocarbon or fatty acid radicles. Such amines are, for instance, o- and p-octadecylaniline or the octadecylether of p-aminophenol.

The condensation of the hydroxy acids with the mono- or diamines is carried out by usual invention are, for instance, the following compounds:

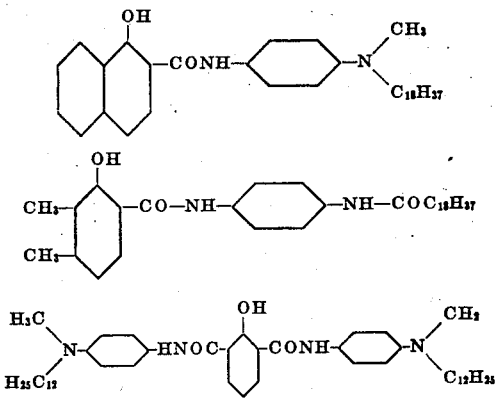

The amines directly substituted by an aliphatic carbon chain are prepared according to known methods. Octadecylaniline is, for instance, formed by causing octadecylalcohol to react on aniline in the presence of water-binding agents such as zinc-chloride free from water or aluminumchloride. The preparation of amines having linked thereto a carbon chain ether-like are likewise known per se. The aminophenoloctadecylether may be produced by condensing sodium nitrophenate with octadecylbromide and subsequently reducing the condensation product thus formed. These dyestuff formers are added to a silver halide emulsion in any stage of its production conveniently in the presence of a solvent. It is of advantage, however, that these dyestuff formers contain at least one group capable of rendering them water-soluble. A sulfo group may, for instance, be substituted for the hydrogen atom in the p-position to the hydroxy group by treating the dyestuff former with concentrated sulfuric acid, if desired, while gently warming. The sulfo group may also be introduced into the unsaturated lateral chain as, for instance, an oleyl radicle. Such dyestuff formers are, for instance, the following compounds:

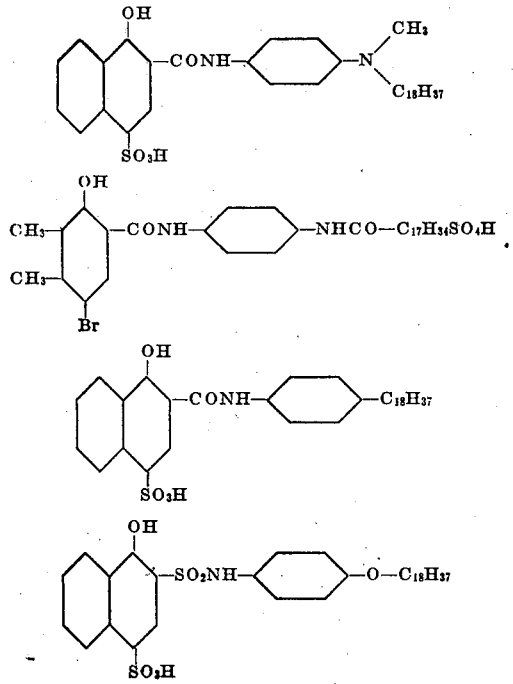

Silver halide emulsions of the present invention may be cast to form a single layer or worked up into a photographic multi-layer material. The other layers may also contain dyestuff formers or are adapted to produce a dyestuff image in another way. The layers may be arranged on one or both sides of the support, if desired, in combination with filter-, intermediate-, and antihalation layers. The color images may be formed by a simple or a reversal development as a negative or a positive, respectively.

The following examples illustrate the invention but they are not intended to restrict it thereto.

*Example 1*

A solution of 10 g. of sodium-1-hydroxy-2-naphthoylamino - 4' - methyloctadecylaminobenzene-4-sulfonate in 100 cc. of water is added to 1 kg. of a silver halide emulsion. The emulsion is then cast to form a layer. On exposure and development with p-dimethylaminoaniline one obtains a blue-green dyestuff image.

Such emulsion, for instance, may be panchromatically sensitized and cast to form a layer on a support. On the layer another layer containing a non-diffusing dyestuff former for purple may be arranged and on this layer a third layer not especially sensitized and containing a non-diffusing dyestuff former for yellow is cast, if necessary, after a filter layer has been inserted. On exposure and development one obtains a complementary dyestuff image.

*Example 2*

10 g. of α-hydroxynaphthoylaminododecylaniline and 5 g. of sodium cholate are dissolved in a mixture of 100 cc. of methanol and 10 cc. of 20% caustic soda solution. The resulting solution is made up to 200 cc. with water and then added to 1 kg. of a silver halide emulsion. A blue dyestuff image is produced by further treating the emulsion in the manner as described in Example 1. Instead of adding the solution of the dyestuff component to the finished emulsion it is also possible to mix the solution with a gelatin solution whereupon the resulting gelatin solution, if desired after solidifying and watering is worked up into a photographic emulsion. By further treatment analogous to Example 1 one likewise obtains a blue image.

We claim:

1. A silver halide emulsion for color forming development containing as the dyestuff former a condensation product from an aromatic hydroxy acid and an aromatic primary amine carrying at least one straight aliphatic carbon chain, at least one of said chains containing more than five carbon atoms, the ring of said amine carrying no acid substituent.

2. A silver halide emulsion for color forming development containing as the dyestuff former a condensation product from an aromatic hydroxy acid and an aromatic primary amine carrying at least one straight aliphatic carbon chain linked to the ring of said amine, by an amino group at least one of said chains containing more than five carbon atoms, the ring of said amine carrying no acid substituent.

3. A silver halide emulsion for color forming development containing as the dyestuff former a condensation product from an aromatic hydroxy acid and an aromatic primary amine carrying at least one aliphatic carbon chain linked to the ring of said amine by a —C—C— linkage at least one of said chains containing more than five carbon atoms, the ring of said amine carrying no acid substituent.

4. A silver halide emulsion for color forming development containing as the dyestuff former a condensation product from an aromatic hydroxy acid and an aromatic primary amine carrying at least one aliphatic carbon chain linked to the ring of said amine by a —C—O—C— linkage at least one of said chains containing more than five carbon atoms, the ring of said amine carrying no acid substituent.

5. A silver halide emulsion for color forming development containing as the dyestuff former a condensation product from an aromatic hydroxy acid and an aromatic primary amine carrying at least one straight-chained hydrocarbon radicle, at least one of said radicles containing more than five carbon atoms, the ring of said amine carrying no acid substituent.

6. A silver halide emulsion for color forming development containing as the dyestuff former a condensation product from an aromatic hydroxy acid and an aromatic primary amine carrying at least one RCOHN-group in which R is a straight chain aliphatic radicle, at least one of said groups containing more than five carbon atoms, the ring of said amine carrying no acid substituent.

7. A silver halide emulsion for color forming development containing as the dyestuff former a condensation product of an aromatic hydroxy acid and an aromatic primary amine containing as the only nuclear substituent besides the primary amino group, a group selected from the class consisting of alkyl, alkoxy, alkylamino and acylamino, said substituent containing an aliphatic straight carbon chain of at least five carbon atoms.

8. The article as defined in claim 1 wherein the dyestuff former is the sodium salt of 1-hydroxy - 2 - naphthoylamino - 4' - methyl - octadecylaminobenzene-4-sulfonic acid.

9. The process of producing dyestuff images in photographic silver halide emulsions containing as a dyestuff former a condensation product of an aromatic hydroxy acid and an aromatic primary amine carrying at least one straight aliphatic carbon chain, at least one of said chains containing more than five carbon atoms, the ring of said amine being free from acid substituents, which comprises subjecting the exposed emulsion to development in a primary aromatic amino developer while causing the oxidation products of the developer to react with said dyestuff former.

10. A silver halide emulsion for color-forming development containing as the dyestuff former alpha-hydroxy-naphthoyl aminododecyl aniline.

11. A silver halide emulsion for color-forming development containing as the dyestuff former 1-hydroxy-2-naphthalene-sulfonyl amino-4'-octadecyloxy-benzene-4-sulfonic acid.

ALFRED FRÖHLICH.
WILHELM SCHNEIDER.